United States Patent [19]
Wolf et al.

[11] Patent Number: 5,421,084
[45] Date of Patent: Jun. 6, 1995

[54] MANUFACTURE OF ELECTRICAL CONTACTS

[75] Inventors: Heinrich Wolf, Gelnhausen; Dieter Feldmer, Nidderau, both of Germany

[73] Assignee: W. C. Heraeus GmbH, Hanau, Germany

[21] Appl. No.: 62,298

[22] Filed: May 14, 1993

[30] Foreign Application Priority Data

May 19, 1992 [DE] Germany .......... 42 16 224.6

[51] Int. Cl.⁶ .......................................... H01R 43/16
[52] U.S. Cl. .......................... 29/885; 29/874; 29/876
[58] Field of Search .................. 29/874, 885, 876

[56] References Cited

U.S. PATENT DOCUMENTS

| | | | |
|---|---|---|---|
| 2,181,083 | 11/1939 | Payette | 29/874 X |
| 3,147,167 | 9/1969 | Bedell et al. | 29/874 X |
| 4,342,893 | 8/1982 | Wolf | 200/268 |
| 4,351,174 | 9/1982 | Bauer et al. | 29/874 X |

FOREIGN PATENT DOCUMENTS

| | | |
|---|---|---|
| 0132596 | 2/1985 | European Pat. Off. . |
| 0300197 | 1/1989 | European Pat. Off. . |
| 1464548 | 3/1969 | Germany . |
| 2922512 | of 1980 | Germany . |
| 7915995 | 1/1982 | Germany . |
| 3107665 | 9/1982 | Germany . |
| 2914314 | 11/1982 | Germany . |
| 3437981 | 8/1986 | Germany . |
| 01/151114 | 6/1989 | Japan . |
| 1111478 | 4/1968 | United Kingdom . |

OTHER PUBLICATIONS

Derwent abstract for DE 29 22512.
Welk et al., "Anwendung von Mikroprofilen fur Elektrische Kontakte", Elektro-Anzeiger, vol. 38, No. 10 (1985).

*Primary Examiner*—Carl J. Arbes
*Attorney, Agent, or Firm*—Felfe & Lynch

[57] ABSTRACT

To manufacture a starting material for electrical contacts, such as relay contacts, a contact sandwich in the form of a metal strip made of a material of good electrical conductivity is bonded to a contact support strip consisting essentially of copper by resistance welding. The bonding surface of the metal strip has wales or ridges running lengthwise, the crests of the ridges being tapered in cross section and being provided with a coating consisting essentially of silver. To produce an electrical contact, the ridges are pressed against a copper contact support and a high heat is produced at the crests of the ridges by a welding circuit. This results in the melting of the silver coating, which is forced between the ridges by the pressure applied through the electrodes of the welding circuit, where it forms a silver-copper alloy with a melting point close to the eutectic. The surface of the strip which is to be the working contact is disposed on the side of the strip opposite the side provided with the ridges.

13 Claims, 2 Drawing Sheets

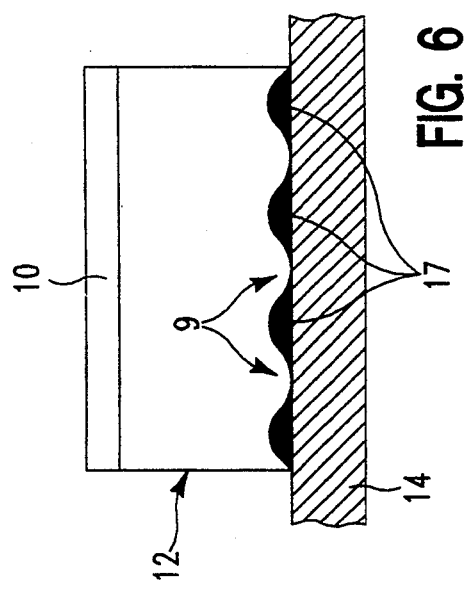
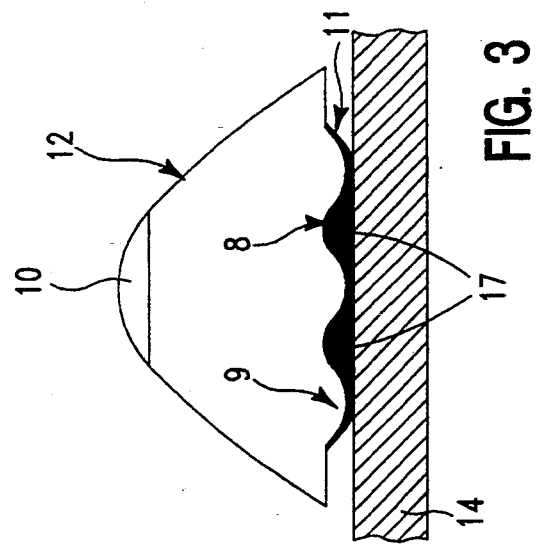
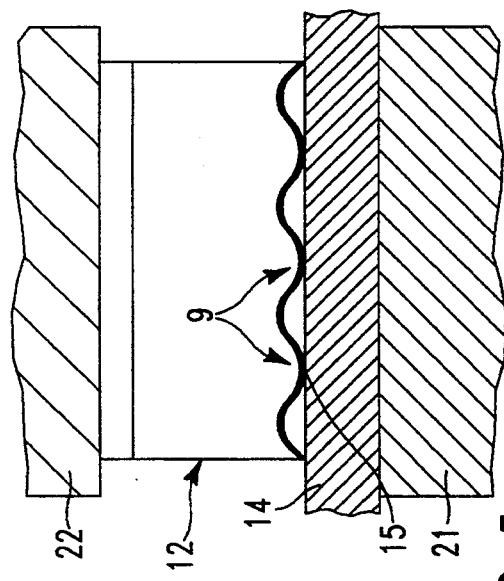
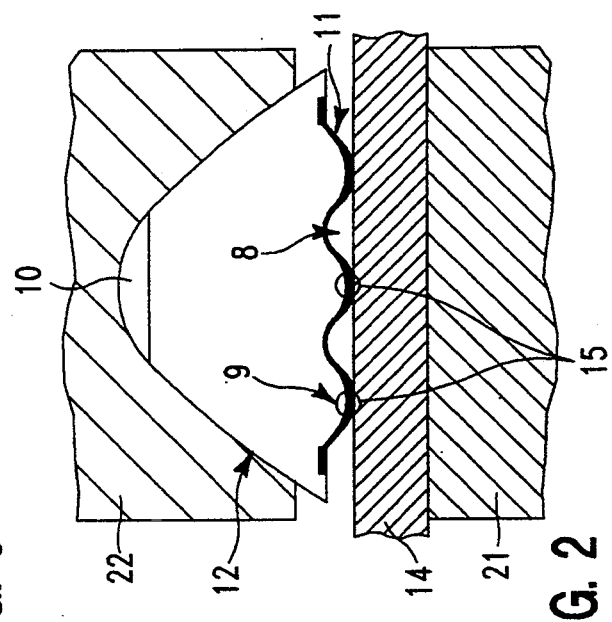
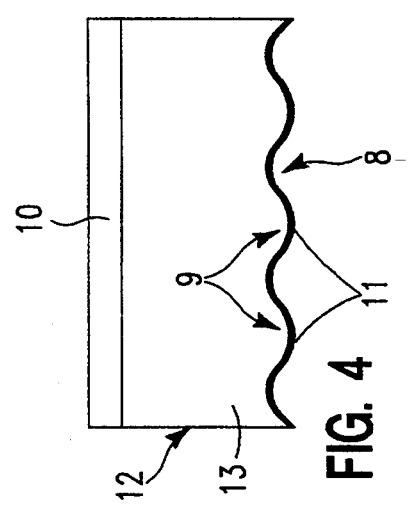
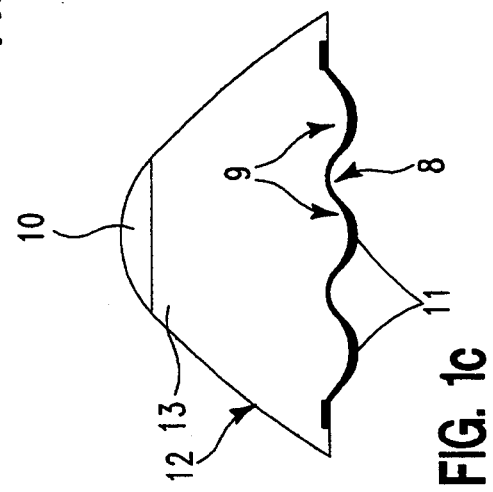

MANUFACTURE OF ELECTRICAL CONTACTS

BACKGROUND OF THE INVENTION

The invention relates to a starting material for the manufacture of electrical contacts which is made by resistance welding the starting material to an electrically conductive contact support consisting essentially of copper. The starting material is a laminated metal strip which has parallel ridges tapering from their base to their crest, formed on the side of the strip which is to be bonded to the contact support. The invention also relates to a method for the manufacture of a semi finished product for electrical contacts, and use of the semifinished product.

U.S. Pat. No. 4,342,893 discloses a starting material for the manufacture of electrical contacts by bonding to an electrically conductive metal contact support by resistance heating, wherein he starting material is in the form of a metal strip. The surface at which he metal strip is to be joined to the contact support has ridges running lengthwise of the metal strip at a distance apart, between which there are valleys which contain solder material; by means of this solder material an electrically conductive and mechanically strong bond is produced by resistance heating between the metal strip which serves as the continuous contact material and the strip which serves as the contact support.

DE-OS 31 07 665 discloses a metal semi-finished product with a strip-like support and a metal overlay, in which the support has on the side facing the overlay elevations and depressions which are covered with an intermediate layer serving as a solder layer. The overlay is bonded to the support by this intermediate layer by resistance welding or soldering.

DE-OS 34 37 981 discloses a method for the manufacture of a semi-finished product for electrical contacts, which consists of a metal contact support strip and a strip applied to it and then resistance welded onto it as the contact material. The strips serving as the contact material have one or more grooves on their side facing the support strip, into which so-called solder strands are separately laid before the resistance welding is performed, and after that they provide a strong bond between the contact support strip and the strip of contact material.

In the miniaturization of components—including contact elements for example—materials of higher electrical conductivity are increasingly being used, which on the one hand involve only slight losses of heat in operation, but on the other hand, due to their high heat conductivity they are difficult to weld or solder. Reference is made to these problems in British Patent No. 1,111,478. Furthermore it is extremely problematic Lo apply the external electrodes for resistance heating without damaging the semimanufactured contact material, especially the noble metal contact layer on the contact material, because even in these transitional areas a great amount of heat is developed which can result in the destruction of the surfaces of the semimanufactured product. Therefore, as the conductivity of the materials of the contact support and contact material increases, it proves to be difficult, on account of the poor bonding and welding possibilities, to produce a reliable and electrically and mechanically strong bond.

Furthermore, the separate feeding of solder material, as disclosed in DE-OS 34 37 981, involves considerable difficulty in practice in the application of separate contact points, such as contact points for relays.

SUMMARY OF THE INVENTION

The invention is addressed to the problem of developing a semimanufactured material for making electrical contacts by bonding to a contact support consisting essentially of copper, in which the material of the contact support can also have a very high electrical conductivity of better than 15 m/(ohms×mm$^2$) or more than (15 S×10$^6$)/m, conductivities of up to (57 S×10$^6$)/m being also usable, such as exist in the case of pure copper. At the same time a metal strip serving as starting material is to be so configured as a strip of contact material that very high current densities and thus a high Joulean electrical heating power are obtained at the points at which the bond is later to be produced, in order to assure a reliable, spatter-free fused bond.

The invention furthermore is addressed to the problem of teaching a method in which a starting material in the form of a metal strip serving as a continuous contact material can be applied to a contact support by fusion bonding with the aid of ridges in which a high Joulean heating is produced, while during the fusion no undesirable effects are o be produced on the contact surface of the metal strip or on the back of the support strip; furthermore, the useful life of the externally applied electrodes is to be improved.

Furthermore, a use for the starting material is to be specified. The starting material is also to be suitable for a method using rolled seam welding as well as for a method of making single contacts.

An important advantage of the invention is to be seen in the fact that coating with the layer containing essentially silver can be applied in a comparatively simple manner by roll plating, and the roll plating process can be performed simultaneously with the roll plating process for applying the contact surface of the metal strip. On account of the tapering ridges on the metal strip in the area of contact with the contact support strip, a virtually punctiform heating can be achieved which occurs only in the bonding area, and due to the formation of an alloy which then ensues, an intimate bond between the metal strip and the contact support can be achieved.

In a preferred embodiment of the starting material, the metal strip consists essentially of nickel, while the coating consists of silver and is applied by roll plating, especially at the ridges, while in the area of the valley-like spaces between the latter no coating at all or only a very slight coating is provided. This is achieved by passing the plated contact strip through profiling rollers which form the ridges. Because the plating material is softer than the contact strip, the plating material is displaced from the valleys onto the crests of the ridges during profiling.

During bonding of the profiled contact strip to the contact support, the plating material based on silver is displaced by heat and pressure from the crests of the ridges into the valleys and is converted with the material of the contact support, which is based on copper, into an alloy whose melting point is lower than that of copper and also that of silver. The thickness of the plating material, the pressure, and the electrical current are preferably chosen so that the alloy has the eutectic point composition. In this manner, a stable configuration of contact support and metal strip is sustained advantageously during the resistance heating, while the fusion and alloy in take place in The actual bonding area between the metal strip that is the contact material and the contact support strip. On account of the high current density in the bond area with its high thermal efficiency it is advantageously possible to avoid undesirable thermal stresses everywhere in the welding circuit, the duration of the welding current pulse being in practice definitely less than 10 milliseconds.

BRIEF DESCRIPTION OF THE DRAWING

FIG. 1c shows a cross section of the starting material, in which the coating and contact layer are also visible, FIG. 2 is a cross section of the starting material inserted in the electrode apparatus, the contact support being shown also in cross section, FIG. 3 is a cross section of the contact strip and contact support strip after the welding procedure, FIG. 4 is a cross section of a contact strip with a plurality of ridges shows the contact strip of FIG. 4 before the FIG. 5 shows the contact strip of FIG. 4 before the welding procedure.

FIG. 6 shows the contact strip explained in FIG. 4, after it has been bonded to the contact support.

DETAILED DESCRIPTION OF THE PREFERRED EMBODIMENT

Figures 1A, 1B:
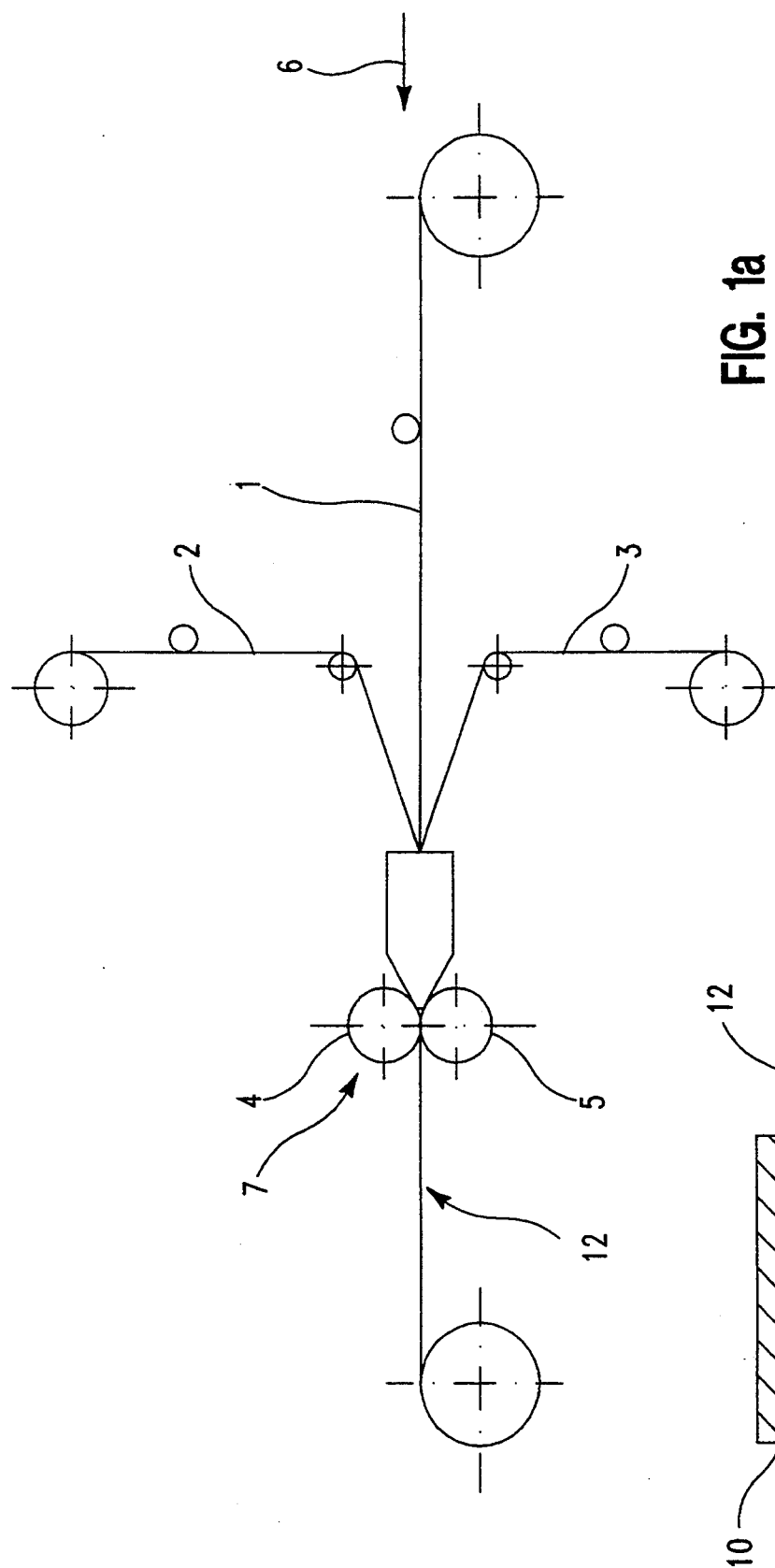
FIG. 1a is a diagrammatic view along the line of movement of the strip, which shows how the starting material is made by coating.
FIG. 1b is a diagrammatic longitudinal section of a piece of the starting material with the coating applied and the contact layer.

According to FIG. 1a, the blank strip 1 is fad in the longitudinal direction 6 to a rolling apparatus 7 consisting of the rolls 4 and 5, the contact strip 2 being fed from above the blank strip 1, while the coating strip 3 runs beneath the blank strip 1 in the rolling processes and annealings that follow, which are not represented here, the metal strip is shaped to its final profile. The roll profiles in the successive rolling procedures are of such a shape that the metal strip is given a kind of gable-shaped cross section on its upper side, while the underside is provided with a given number of ridges. The number of ridges is best governed by the width of the metal strip and the desired strength of the bond between the contact support and the metal strip.

In FIG. 1b, the area of the later working contact 10, has been made from the contact strip 2, while the coating 11 has been made from the coating strip 3. The core part 13 of the metal strip 12 constituting the continuous contact material was formed from the blank strip 1.

The makeup of the metal strip 12 can best be seen in the cross section represented in FIG. 1c. On the top side of the triangular cross section can be seen the contact part 10 made, for example, on the basis of a gold alloy or silver-palladium alloy while the coating area ii based on silver or silver alloy is plated onto the ridges 9.

It can easily be seen in FIG. 1c that the coating area is concentrated essentially on the crests of the ridges 9, while the valley or groove areas 8 between them have bun a very thin coating or none at all. This is accomplished during profiling, when the softer plating material is displaced from the valleys between the ridges to the crests of the ridges.

The materials for the blank strip 1 are mainly nickel, while the contact part 10 is made of a gold-silver alloy, such as AuAg 10, while the coating 11 covering the ridges 9 consists essentially of silver, i.e., of pure silver.

The contact support strip 14 consists of copper, although it is also possible to use a copper alloy with a high copper content for the contact support strip.

FIG. 2 shows the metal strip 12 placed on contact support strip 14; the coating 11 on he ridges 9 lies directly on the contact support strip, and the back of the contract support strip 14 as well as the upper side of the metal strip 12 provided with the contact part 10 are grasped by he electrodes 21 and 22, respectively, of the welding circuit not further represented here. From this figure it can be seen that the current density increases from the area of the ridges 9 toward the con act support 14, thereby achieving an increasingly greater heat output, so hat the coating 11 in the initial phase of the welding current pulse is made to melt, whereupon the material of the coating is then forced by the pressing action of the electrodes 21 and 22 into the areas of the grooves 8, where it forms an alloy with the copper of he contact support 14.

FIG. 3 shows in cross section a continuous contact material after it has left the electrode apparatus represented in FIG. 2 and is bonded to the contact support strip 14 lying beneath it. It can easily be seen in FIG. 3 that he coating 11 originally on the crests of the ridges 9 has been removed from the ridges 9, and in the interstices or grooves 8 it has formed with the copper supplied by the contact support strip 14 an area of bonding between contact support strip 14 and metal strip 12 through fusion by means of resistance heating. During the welding procedure, the action of the electric current heats the contact area identified by reference number 15 in FIG. 2 until he silver from the coating area 11 and the copper from the contact support strip 14 alloy with one another, so that a new alloy 17 is formed which corresponds to or is very close to the eutectic for an alloy containing 28 wt.-% of copper, balance silver (AgCu 28) with a melting point at 779° C.

FIG. 4 shows a continuous contact material 12 manufactured as starting material by a similar process and having a plurality of ridges. These ridges 9 are likewise provided with a coating 11.

FIG. 5 represents metal strip 12 of FIG. 4 placed on the contact support 14 before the welding procedure; the two electrodes 21 and 22 form, as already explained with the aid of FIG. 2, a part of the welding circuit.

As seen in FIG. 6, a welding alloy 17 consisting of a silver-copper alloy containing about 72 wt.-% of silver and about 28 wt.-% of copper is formed between the ridges 9. As was the case in FIG. 3, this produces an electrically conducting and strong mechanical bond is produced between the continuous contact material from metal strip 12 and the contact support strip 14.

We claim:

1. Method for producing an electrical contact, said method comprising the following steps
   providing a metal strip having a bonding surface and an opposed contact surface,
   plating said bonding surface with a plating material consisting essentially of silver, and
   rolling said metal strip to form parallel ridges separated by valleys in said bonding surface with said plating material thereon.

2. Method as in claim 1 wherein said plating is performed by galvanic deposition.

3. Method as in claim 1 wherein said plating is performed by roll plating, said metal strip and said contact material both being continuous strips.

4. Method as in claim 2 wherein said contact surface is plated by roll plating simultaneously with the plating of said bonding surface.

5. Method as in claim 1 comprising the additional step of pressing said ridges agains a contact support strip consisting essentially of copper, and heating said plating by passing an electrical current therethrough so that said plating melts and runs into said valleys and forms an alloy with the copper of the support strip.

6. Method as in claim 5 wherein said electrical current is chosen so that the alloy has the eutectic point composition for copper and silver.

7. Method as in claim 5 wherein said ridges are pressed against said support strip with sufficient pressure during heating so that said ridges penetrate into said support strip as said alloy is formed.

8. Method as in claim 5 wherein said alloy has a composition of about 28% copper.

9. Method as in claim 5 wherein the alloy has a Cu:Ag ratio between 20:80 and 40:60.

10. Method as in claim 1 wherein said metal strip and said plating material have respective melting points, the melting point of the plating material being lower than the melting point of the metal strip.

11. Method as in claim 10 wherein said metal strip consists essentially of nickel.

12. Method as in claim 1 wherein said ridges have crests between said valleys, said plating material being substantially thicker on the crests of the ridges than in the valleys.

13. Method as in claim 12 wherein each ridge has a height measured from the valleys to the crests, said plating material having a thickness on the crests, said rolling being performed so that the ratio of said thickness to said height ranges from 1:2 to 1:10.

* * * * *

UNITED STATES PATENT AND TRADEMARK OFFICE
CERTIFICATE OF CORRECTION

PATENT NO. : 5,421,084
DATED : June 6, 1995
INVENTOR(S) : Wolf et al.

It is certified that error appears in the above-indentified patent and that said Letters Patent is hereby corrected as shown below:

In column 3, line 26 and 27, of the Patent, change "ridges showing the contact strip of FIG. 4 before the" to --ridges.--

In column 3, line 58 of the Patent, delete "ii" and substitute --11--

Signed and Sealed this

Twenty-sixth Day of May, 1998

Attest:

BRUCE LEHMAN

Attesting Officer

Commissioner of Patents and Trademarks